United States Patent [19]

Aten, Jr. et al.

[11] Patent Number: 5,135,075

[45] Date of Patent: Aug. 4, 1992

[54] CHILD'S SAFETY DEVICE

[76] Inventors: Carl K. Aten, Jr.; Rose R. Aten, both of 18440 Tapadero Ter., Boca Raton, Fla. 33496

[21] Appl. No.: 636,261

[22] Filed: Dec. 31, 1990

[51] Int. Cl.$^5$ .................. B62B 11/00; B62B 9/24
[52] U.S. Cl. .................................................. 182/3
[58] Field of Search ................................. 182/3–5; 119/96; 280/33.933

[56] References Cited

U.S. PATENT DOCUMENTS

| | | | |
|---|---|---|---|
| 758,123 | 7/1902 | Weis | 119/96 |
| 1,326,716 | 12/1919 | Dunning | 119/96 |
| 1,332,328 | 3/1920 | Fisher | 119/96 |
| 1,967,767 | 7/1934 | Diez | 182/3 |
| 2,208,990 | 3/1940 | Lewis | 119/96 |
| 3,301,594 | 1/1967 | Pukish | 182/3 |
| 4,324,430 | 4/1982 | Dimas | 280/33.993 |
| 4,537,154 | 8/1985 | Kay | 182/3 |
| 4,550,800 | 11/1985 | Dietrich | 182/3 |
| 4,621,589 | 11/1986 | Thinnes | 119/96 |
| 4,854,607 | 8/1989 | Mandrecchia | 280/33.992 |
| 4,867,464 | 9/1989 | Cook | 280/33.993 |

Primary Examiner—Reinaldo P. Machado

[57] ABSTRACT

A child safety device used to restrain the freedom of movement and give protection against falling from a guardian attended, modern grocery cart. A safety device in light weight form that can be attached and released with the utmost ease and conveniently carried within the attendant's personal belongings. The belt component is wide enough to support the lower part of the abdomen. The front strap component of same width, braces the child's torso, conforms to and crisscrosses diagonally over the front mid section of the chest. Total tethering is accomplished by means of four clasp hooks. Two clasp hooks secure the shoulder straps to the top back seat of the modern grocery cart and two clasp hooks secure the belt components to the sides of the vertical frame or lower part of the fold down seat within the shopping cart and similar vehicles.

1 Claim, 2 Drawing Sheets

CHILD'S SAFETY DEVICE

The present invention relates in general, to a safety device for small children and in particular to a safety device comprised of horizontal and diagonal straps and a tether arrangement of clasp hooks, incorporating slip members as a means for adjusting the straps.

BACKGROUND OF THE INVENTION

Many times it is necessary to have a safety device for a child while shopping for weekly or daily staple goods. Such a safety device should be easily carried and require little effort to operate. Safety and security devices are well known in the prior art. The devices or harnesses disclosed in the prior art, however, are not particularly intended as a child safety device to protect against falling and are not well adapted for use when a guardian is shopping and must leave the child unattended for a moment in order to select or remove merchandise from a store shelf to a modern grocery cart. A need exists for a child safety restraining device which can be, easily and conveniently, attached to a grocery cart allowing the guardian the freedom to shop and move about without having to continually monitor the activities of the child. It is, therefore, the object of the present invention to provide a new and greater safety restraining device for small children, incorporating the utmost safety features, ease and affordability. Some examples of the prior art safety and security devices and harnesses and other structured for supporting articles, are set forth in the patents briefly described below:

The Mandrecchia U.S. Pat. No. 4,854,607 shows a harness for small children adapted to secure a child to an independent structure such as a shopping cart. The harness further has a strap unit and tether unit to lock the child to the shopping cart. The harness of the Mandrecchia patent safely secures the child from abduction and does protect the child from moving about in the seat, however the harness with tether and locking means is an encumbrance for most guardians.

The Thinnes U.S. Pat. No. 4,621,589 also shows a security device for children which attaches to a conventional shopping cart and restricts the distance a child can wander from the parent or guardian. The harness further has a reel attached to the shopping cart by a lock. The purpose of the harness is to safely secure the child from abduction, however the Thinnes patent is "bulky" and contains a locking means which renders the harness useless if the lock becomes inoperative. Further, the Thinnes patent does not restrict the movement of the child within the seat of the shopping cart.

The Zimmerman U.S. Pat. No. 4,666,017 illustrates a child's safety harness for use in crowded places with high density of population. The safety harness is for use when the child is actively moving about and not secured within a seating position.

The Kay U.S. Pat. No. 4,537,154 and the Moorman, U.S. Pat. No. 4,597,359 discloses a safety vest or harness for pets or small children. The harness is a panel of flexible material shaped to pass around and underneath the body of the animal or child. The harness is used in connection with a conventional automobile. Although the child is safely restrained in an automobile, it has little value as a safety device for the modern shopping cart.

The Lewis U.S. Pat. No. 2,208,990 shows a safety belt with a reinforcing structure meant to fit around the body in a manner similar to a harness; however the device does not surround to body to secure it within a structure.

The Weis U.S. Pat. No. 758,123 illustrates a harness used in connection with a child's carriage. The front body of the harness is secured around the upper back and side straps extend downward to hook to the carriage. However, the harness was used to restrain a child within a moving carriage during the early 1900's and is not readily adaptable to a modern shopping cart.

SUMMARY

The principal object of the present invention is to provide a safety device that allows a child to be placed comfortably within a shopping cart seat while allowing the child ample movement without danger.

It is also an object of the present invention to provide such a safety device which is of simple and inexpensive construction.

Another object of this present invention is to provide such a safety device in a light weight form that can be attached and released with the utmost ease and also be conveniently carried within the attendant's personal belongings.

A further object of this new invention is to provide a safety device constructed for use within a modern grocery cart having a frame mounted on wheels and including a general vertical frame member on similar independent structure.

The foregoing object can be accomplished by constructing a safety device that forms the basis of a belt component, strap components and tether components. The belt component is wide enough to support the child at the lower part of the abdomen. The safety restraining device has clasp hooks on each end as a means of securing the belt component to the shopping cart. A front strap component of the same width supports the child's torso, conforming to and criss-crossing diagonally over the front mid section of the child's chest; thereby forming a brace. The diagonal strap, after passing over the child's shoulders is attached to the back of the shopping cart seat by means of a clasp hook. Each strap component is made adjustable by means of a slip or slide element.

Total tethering is accomplished by means of four clasp hooks. Two clasp hooks secure the shoulder straps to the top back of the shopping cart seat and the two clasp hooks secure the belt component to the sides of the vertical frame or lower part of the fold down seat within the shopping cart.

DETAILED DESCRIPTION OF DRAWINGS

Figure 1:
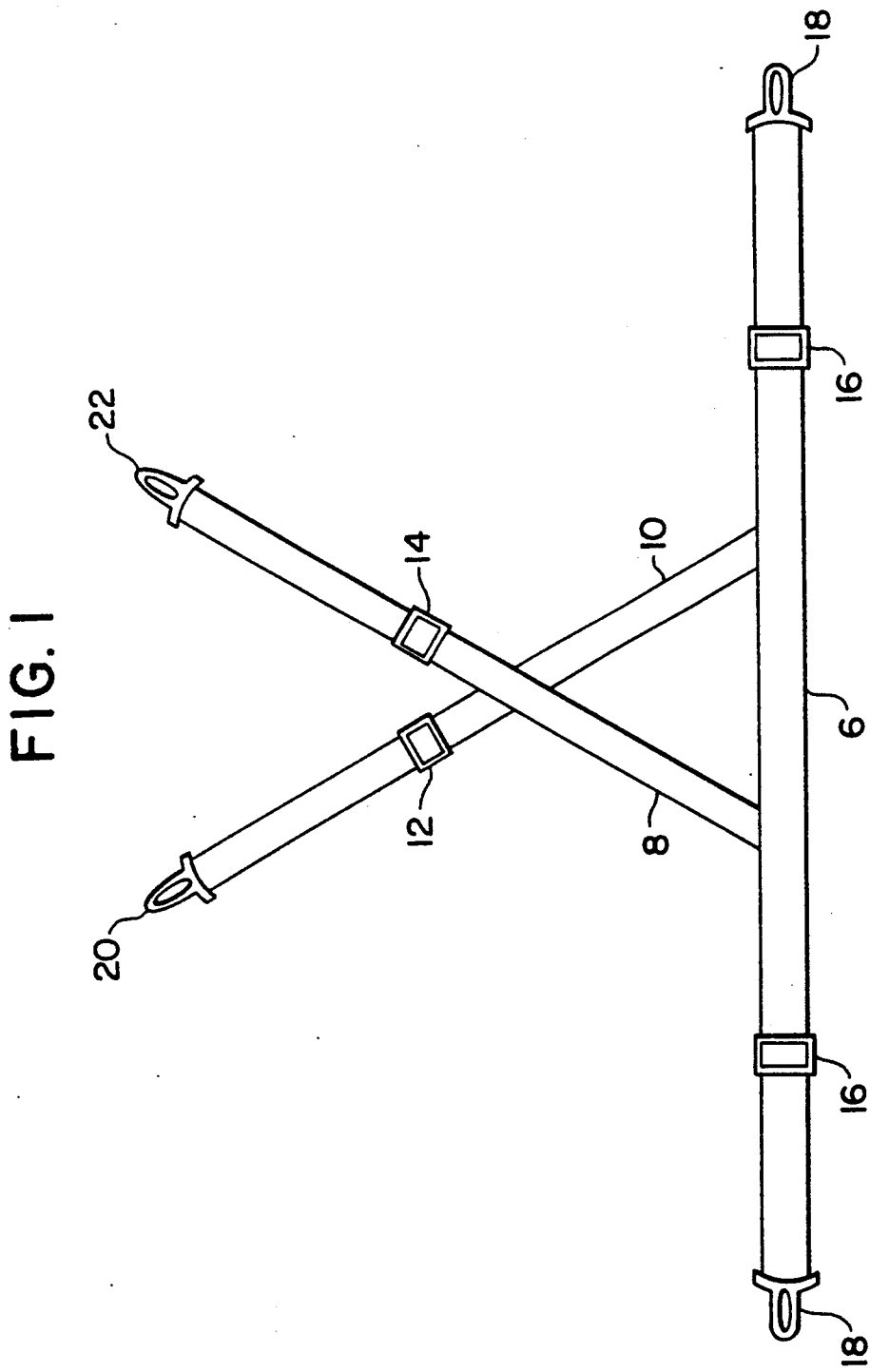
FIG. 1 is a plan view of the present invention of the child safety device.

Referring now to FIG. 1, the preferred safety device, in accordance with the present invention, is comprised of a belt component (6) with one inch or wider webbing measuring 24 inches in length. The approximate length of the belt component (6) will expand to a length of 30 inches. Two slip members are woven into the webbing on each side of the belt component (6). The bottom end portion of the two clasp hooks (18) has webbing passing through to connect with and to be woven underneath the slip members (16) with reinforced stitching. The safety restraining device thus has a clasp hook (18) at each end portion of the belt component (6). The slip members (16) are incorporated into the belting component (6) to adjust to the desired width of the child.

A pair of strap components (8)(10) are equally reinforced at the upper and lower portion of the belt component (6) width. Each strap component (8)(10), is diagonally positioned and reinforced into place within two and one half inches of the center position of the belt component (6). Two slip-members (12)(14) are woven into each strap component (8)(10) approximately 6 inches from the top edge of the belt component (6). The open end portion of the clasp hooks (20)(22) has the webbing passing through to connect with and be woven underneath the slip members (12)(14) with reinforced stitching. The strap components (8)(10) along with slip members (12)(14) adjusts to a length approximately eighteen and one half inches to conform with the height of the child's torso.

Preferably, all of the clasp hooks are light weight metal, such as a steel coated or stainless steel hooks. The slip members are molded from either light weight metal or a plastic single bar slide under the UL listed code. The safety device is constructed on nylon webbing with a per inch break strength that is UL listed.

Figure 2:
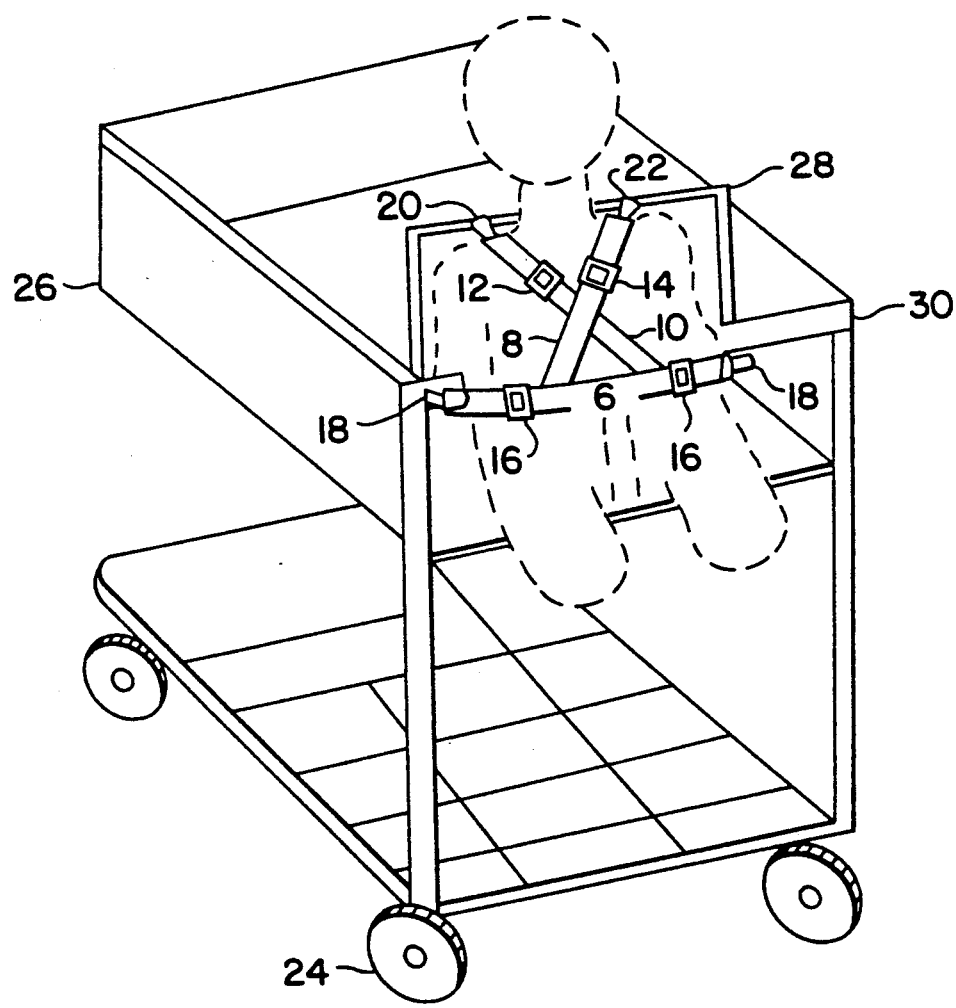
FIG. 2 is a front perspective view of a child wearing the safety device of the present invention.

Referring now to FIG. 2, the preferred safety device in accordance with the present invention, is for use in a modern grocery cart mounted on wheels (24), with a vertical frame (26), a fold down seat (28) with a horizontal bar (30) as the basic structure. The safety device is attached to each side of the vertical frame member (26) or lower side of the folded down seat (28) with releaseable clasp hooks (18) which are controlled by the guardian. The safety device includes a pair of adjustable straps incorporated with slip members (16) to regulate a predetermined length of reinforced strapping (6) across the lower abdomen. A pair of front strap components (8)(10) are wide enough to support the child's torso while conforming to and criss-crossing diagonally across the front mid-section of the child's chest. The strap components (8)(10) after passing in front of the child, are secured at the top back aperture of the fold down seat (28) with clasp hooks (20)(22). Similarly, a pair of adjustable slip members (12)(14) are woven into the webbing to extend to the required height of the torso. The diagonal straps (8)(10) and belt components (6) are constructed to regulate the length and width so that they may conform to the distance the child may move within the seat of the modern shopping cart.

It is the object of the new invention to provide a new and greater safety device, suitable for small children, which is attachable to a modern grocery cart in a manner that will safety restrain the child to prevent injury, while giving the child a reasonable amount of mobility during normal activities.

When the guardian of the child is shopping, it is often difficult to keep a small child from moving about in a dangerous manner; such as turning around, standing up in the seat or leaning over the side. For the rambunctious child, the seat of a grocery cart and similar vehicles, is often too confining and the child will behave in a dangerous manner. The guardian is thus faced with the problem of manipulating the cart and also attending to the child, which usually requires holding the child by the hand. Such duel action makes it extremely difficult for the guardian to do the shopping which requires inspection and placement of articles from the shelves into the basket of the grocery cart. While the guardian is preoccupied with shopping activities, it is not unusual for the child to stand up, turn around or move their legs and feet to a sideways position causing an unsafe environment and possible injury. The safety device may, as an alternative, be provided by the store as a permanent part of the modern grocery cart by permanently securing the shoulder straps of the safety device to a spaced tubular aperture on the top aperture of the fold down seat (28) within the vertical frame member (26).

The present invention can be easily manufactured and constructed with flexible material at economical costs.

We claim:

1. A safety harness adapted to be worn by a child seated in a shopping cart, said cart having a seat including a bench section and a back section comprising:

a pair of elongated shoulder strap members defining front crossed pairs of extended ends and reap pairs of extended ends, a belt member adapted to extend across the front lower torso of a child seated on said bench section and against said back section, hook means on the ends of said belt members adapted to releasely engage said back section of said shopping cart at selected position on each side of said child, the front pair of said extended ends of said shoulder strap members crossing each other and being attached to said belt member at spaced points, releasable hook members on the pair of rear extended ends of said shoulder strap members to engage said back section of said seat and means for adjusting the lengths of said belt member and each of said shoulder strap members.

* * * * *

UNITED STATES PATENT AND TRADEMARK OFFICE
CERTIFICATE OF CORRECTION

PATENT NO. : 5,135,075
DATED : August 4, 1992
INVENTOR(S) : Carl K. Aten, Jr., et. al.

It is certified that error appears in the above-indentified patent and that said Letters Patent is hereby corrected as shown below:

Column 4, line 34 of claim 1, should read-- front crossed pairs of extended ends and rear pairs--.

Signed and Sealed this

Seventh Day of September, 1993

Attest:

BRUCE LEHMAN

Attesting Officer     Commissioner of Patents and Trademarks